(12) United States Patent
Korzhenko et al.

(10) Patent No.: US 7,211,202 B2
(45) Date of Patent: May 1, 2007

(54) PROCESS TO MAKE A CONDUCTIVE COMPOSITION OF A FLUORINATED POLYMER WHICH CONTAINS POLYANILINE

(75) Inventors: Alexander Korzhenko, Saint Victor d'Epine (FR); Alexander Pud, Kyiv-94 (UA); Galina Shapoval, Kyiv-94 (UA)

(73) Assignee: Atofina, Puteaux (FR)

( * ) Notice: Subject to any disclaimer, the term of this patent is extended or adjusted under 35 U.S.C. 154(b) by 498 days.

(21) Appl. No.: 10/734,596

(22) Filed: Dec. 15, 2003

(65) Prior Publication Data

US 2004/0181011 A1    Sep. 16, 2004

Related U.S. Application Data

(60) Provisional application No. 60/435,256, filed on Dec. 23, 2002.

(30) Foreign Application Priority Data

Dec. 13, 2002   (EP)   ................... 02293103

(51) Int. Cl.
*H01B 1/12*   (2006.01)
(52) U.S. Cl. ...................... 252/500; 252/502
(58) Field of Classification Search ................ 252/500, 252/502; 528/210
See application file for complete search history.

(56) References Cited

U.S. PATENT DOCUMENTS

| 5,286,413 A | 2/1994 | Hannecart et al. |
| 6,235,220 B1 | 5/2001 | Pron et al. |

FOREIGN PATENT DOCUMENTS

JP   61123637   * 6/1986

* cited by examiner

*Primary Examiner*—James O. Wilson
*Assistant Examiner*—Ebenezer Sackey
(74) *Attorney, Agent, or Firm*—Millen, White, Zelano & Branigan, P.C.

(57) ABSTRACT

The process of the present invention is a process to make a conductive fluorinated polymer composition (also called composite) wherein:
a) an aqueous solution of an anilinium salt is mixed with an aqueous dispersion of a fluorinated polymer,
b) then an oxidant is added to the mixture of step a) to make a blend of said fluorinated polymer and doped polyaniline (PANI),
c) by-products and unreacted aniline are removed by washing with water or an alcohol to get a blend of purified fluorinated polymer and doped PANI,
d) eventually the purified fluorinated polymer and doped PANI of step c) can be mixed with an acid,
e) water is removed from the purified fluorinated polymer and doped PANI of step c) or d) if any and the remaining powder is melted and shaped in films, pellets or any object.

15 Claims, No Drawings

PROCESS TO MAKE A CONDUCTIVE COMPOSITION OF A FLUORINATED POLYMER WHICH CONTAINS POLYANILINE

This application claims the benefit of the filing date of U.S. Provisional Applications Ser. No. 60/435,256 filed Dec. 23, 2002.

Conducting polyvinylidene fluoride (PVDF) compositions have a wide potential use in different important and practical fields (antistatic and shielding materials, conducting coatings, membranes, battery electrodes, printer rolls, etc.). In industry in most cases essential conductivity of such composites is achieved by the addition of a high quantity (~16%) of inorganic fillers (soot, graphite, metal powders, etc.) to a polymer matrix. As a result, their mechanical properties are strongly deteriorated in comparison with parent polymers, specifically with PVDF. This highly narrows the scope of the useful applications of the compositions. Accordingly, this is an important scientific and commercial problem. Its solution can be achieved both through a decrease in the quantity of the conducting fillers and/or a change of their nature. One of the most interesting approaches is to use intrinsically conducting polymers, specifically polyaniline (PANI), polythiophene, polypyrrole and their derivatives as the fillers, which have much better specific features and are more compatible with a matrix polymer than inorganic fillers.

Among these polymers, PANI is known as the most stable and probably the least expensive. As a consequence, it and its conducting PVDF compositions can be considered as having a good potential to change inorganic fillers for the industrial applications. However, to apply these materials for practice there is a necessity to develop their compositions and methods for producing the same, which are technologically suitable.

Briefly, the compositions of the present invention are made by polymerization of an anilinium salt in the presence of a fluorinated polymer dispersed in water. Then water is removed, the remaining powder is melted and shaped in films, pellets or any object.

Currently, different ways have been already described in the prior art to make conductive compositions which contain polyaniline. These compositions are often described as a polymer matrix containing doped PANI (polyaniline). aniline derivatives. The term "doped" polyaniline as used herein is understood to refer to the conductive emeraldine salt form of polyaniline as opposed to the neutral emeraldine base form which is non-conductive. Starting with the insulating emeraldine base form, polyaniline can be rendered conducting through two independent doping routes:

Oxidation either electrochemically (by means of an electrochemical charge transfer reaction) or chemically (by means of chemical reaction with an appropriate oxidizing agent such as $(NH_4)_2S_2O_8$, $K_2S_2O_8$, FeCl3, etc).

Protonation through acid-base chemistry by exposure to protonic acids (for example, in aqueous environment with pH less than 2–3).

These two different routes lead to distinctly different final states. The oxidation causes a change in the total number of $\pi$-electrons on the conjugated chain and thereby renders it conductive. The protonation gives no change in the number of electrons, the material is rendered electrically conductive by protonation of the imine nitrogen sites.

The U.S. Pat. No. 6,235,220 concerns compositions for manufacturing composite materials containing a polyaniline. These compositions are formed by a solution in a solvent such as m-cresol of the following constituents: a) a conductive polyaniline protonated by means of a protonation agent able to promote the dissolution of the polyaniline in the solvent, for example phenylphosphonic acid, b) an insulating polymer chosen for example from amongst the cellulosic polymers and polyvinyl chlorides such as cellulose acetate, and c) an insulating plasticiser such as a mixture of dimethyl phthalate, diethyl phthalate and triphenyl phosphate. By pouring this solution and evaporating the solvent, it is possible to obtain a flexible film of conductive composite material having good electrical and mechanical properties. It does'nt disclose fluorinated polymers.

Similar prior arts describe compositions produced by counterion-induced processibility way, which is based on the use of the mixed solution of doped PANI or its derivatives and matrix polymer in m-cresol, toluene, chloroform, dimethylacetamide etc. (Y. Cao, P. Smith, A. J. Heeger, Synth. Met., 48, 91, 1992, Mattoso and Malmonge, Polymer, 40, 513, 1999). Other prior arts describe solution blending mainly in N-methylpyrrolidone of undoped PANI with some polymers (Y. Cao, P. Smith, A. Heeger, Polymer, 30, 2305, 1989.) followed by a solution casting/spraying and removing the solvent from the articles. These techniques have opened the possibility to produce conducting PANI composites. However, they require solubility of doped PANI and matrix polymer in the same solvent. As a consequence they can be applied only to a limited number of polymers.

The U.S. Pat. No. 5,928,565 describes an electrically conducting plastic material produced by blending a polyaniline or a derivative thereof with an organic sulfonic acid or a derivative thereof. A reaction product or blend of a polyaniline or a derivative thereof with an organic sulfonic acid or a derivative thereof can be brought to an easy-to-handle or directly melt-processable form through a heat-treatment process carried out at approx. +40° C. to +250° C. The obtained plastic material is advantageously further improved by blending the heat-treated reaction product or blend with a thermoplastic polymer and then melt-processing the mixed blend. The properties of the resulting compound material exhibit complete compatibility of the heat-treated reaction product or blend with the thermoplastic polymer. It does't disclose fluorinated polymers.

Other similar prior art describe composites produced by dry blending technique through mechanical mixing of doped PANI with a thermoplastic polymer followed by melt processing, then compression, extrusion or injection molding (e.g. Morgan et al., J. Mater. Sci. 36, 5369, 2001; Zilberman et al. J. Appl. Pol. Sci. 66, 243, 1997; WO 9920685). However it requires previous synthesis of PANI and its redoping by functionalized protonic acids.

The U.S. Pat. No. 5,508,348 describes a composite formed wherein particles of a conductive polymer are uniformly distributed within a processable non-conductive polymer. In the method of the invention, an inverted emulsion is formed by dispersing an aqueous solution of oxidant in an organic solvent comprising a host polymer and an oil-soluble surfactant. A monomer whose polymerization yields a conductive polymer which is dissolved in a solvent miscible with the organic solvent of the emulsion is then added dropwise to the emulsion with agitation. The composite is separated from the emulsion and the precipitate is washed and dried. It does'nt disclose fluorinated polymers.

Other similar prior art describe emulsion latex compositions produced by emulsion polymerization or co-polymerization of aniline in a presence of a stabilizer, a matrix polymer or corresponding monomer in a non-aqueous phase dispersed in water. It is followed by a treatment of the latex composition obtained to produce a conducting composite article. This way also allows doped conducting PANI composites. However, preparation of the latex composition normally goes through two steps giving conducting phase with polyaniline doped by thermally unstable HCl (patent EP 1061530-A1), that requires an additional stage of redoping by other thermally stable dopants to use melting treatment of the composite produced from the latex. The way is limited by nature of an insulating matrix polymer or corresponding monomer, which should be dissolved in the solvents used.

The U.S. Pat. No. 5,494,609 describes an electrically conductive coating composition including an intrinsically conductive polymer dispersed in a film-forming thermoplastic matrix. The coating composition also includes at least one organic solvent capable of dissolving the dispersion. A method according to the invention includes the steps of preparing a dispersion of an intrinsically conductive polymer in a film-forming thermoplastic matrix. The method also includes the steps of dissolving the dispersion in an organic solvent and forming a film from the dissolved dispersion. It does't disclose fluorinated polymers.

Similar prior arts describe dispersion compositions produced both by aniline hydrochloride polymerization in presence of sulfonated or carboxylated polymer dispersions stabilized with surfactant (e.g. Kim et al. Polymer, 43, 111, 2002) and by suspending previously synthesized polyaniline in polymer dispersion/solution in organic/water continuous phase stabilized with a surfactant (JP 08120167, JP 08-057411). In the case of aniline polymerization in the polymer dispersions the way is limited by use of polymer with acidic function and the thermally unstable dopant HCl as well as by necessity of a surfactant addition. As a consequence, these drawbacks lead to subsequent redoping of polyaniline formed and do not allow modification of polymers without acidic function. On the other hand suspending of PANI in a polymer dispersion/solution requires both organic solvents, which are not always technologically suitable and previous synthesis of PANI that is not always applicable by a cost reason.

The patent application WO 9837964 (PCT/US98/03424) relates generally to composites and, more particularly, to polymer composites containing inorganic or organic materials disposed in the polymer's free volume and to oxyhalopolymer composites and surface-oxyhalogenated nonhalopolymer composites, and to methods of making and using same.

It also relates to a method for making a composite. A polymer having free volume therein is provided. The free volume of the polymer is evacuated, and inorganic or organic molecules are infused into the polymer's evacuated free volume. In a particularly preferred embodiment of the invention, the inorganic or organic molecules are then polymerized under conditions effective to assemble the inorganic or organic molecules into macromolecular networks. In an alternative particularly preferred embodiment of the invention the polymer comprises a functionality, and the inorganic or organic molecules are treated under conditions effective to cause the inorganic or organic molecules to interact with the polymer's functionality.

In addition, composites of this prior art can have a surface which optionally contains halogen atoms, a portion of which have been replaced with hydrogen atoms and oxygen atoms or oxygen-containing groups. The oxyhalopolymer surface retains many of the positive attributes characteristic of halopolymer surfaces, such as tendency to repel water and other polar solvents, high thermal stability, and low adhesion and friction coefficients. However, unlike halopolymer surfaces, the surfaces of the oxyhalopolymer composites of this prior art have reactive chemical sites which permit bonding with other chemical functionalities, such as organosilicons, organometallic precursors, transition metal ions and compounds, transition metal films, fluorescent compounds and other dyes, and biological materials, such as proteins, enzymes, and nucleic acids. In addition, by proper choice of the infused inorganic material and chemical functionality at the surface, polymer composites having an inorganic surface which is the same as, silmilar to, or different from the infused inorganic material can be prepared. Such materials are useful, for example, in preparing metal oxide/fluoropolymer composites having a pure metal oxide surface. The description recites fluorinated polymers and aniline as the monomer to be polymerized in the free volume of the fluorinated polymer but there is no example and no description of the use as a conductive polymer. Moreover the fluorinated polymer is not in an aqueous dispersion.

BRIEF DESCRIPTION OF THE INVENTION

The present invention comprises a comprehensive process to make a conductive fluorinated polymer composition (also called composite) wherein:
a) an aqueous solution of an anilinium salt is mixed with an aqueous dispersion of a fluorinated polymer,
b) then an oxidant is added to the mixture of step a) to make a blend of said fluorinated polymer and doped polyaniline (PANI),
c) by-products and unreacted aniline are removed by washing with water or an alcohol to get a blend of purified fluorinated polymer and doped PANI,
d) optionally the purified fluorinated polymer and doped PANI of step c) can be mixed with an acid,
e) water is removed from the purified fluorinated polymer and doped PANI of step c) or d) if any and the remaining powder is melted and shaped in films, pellets or any object.

DETAILED DESCRIPTION OF THE INVENTION

As regards the fluorinated polymer, any polymer is denoted which has in its chain at least one monomer chosen from compounds containing a vinyl group capable of opening to polymerize and which contains, directly attached to this vinyl group, at least one fluorine atom, a fluoroalkyl group or a fluoroalkoxy group.

Examples of monomers which may be mentioned include vinyl fluoride; vinylidene fluoride (VF2); trifluoroethylene (VF3); chlorotrifluoroethylene (CTFE); 1,2-difluoroethylene; tetrafluoroethylene (TFE); hexafluoropropylene (HFP); perfluoro(alkyl vinyl)ethers such as perfluoro(methyl vinyl) ether (PMVE), perfluoro(ethyl vinyl)ether (PEVE) and perfluoro(propyl vinyl)ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)nCH_2OCF=CF_2$ in which n is 1, 2, 3, 4 or 5; the product of formula $R1CH_2OCF=CF_2$ in which R1 is hydrogen or $F(CF_2)z$ and z is 1, 2, 3 or 4; the product of formula $R3OCF=CH_2$ in which R3 is $F(CF_2)z-$ and z is 1, 2, 3 or 4; perfluorobutylethylene (PFBE); 3,3,3-trifluoropropene and 2-trifluoromethyl-3,3,3-trifluoro-1-propene.

The fluorinated polymer may be a homopolymer or a copolymer, and may also comprise non-fluoro monomers such as ethylene.

The fluorinated polymer may be a thermoplastic or an elastomer or a thermoplastic elastomer.

The fluorinated polymer is advantageously chosen from:
Vinylidene fluoride (VF2) homopolymers and copolymers preferably containing at least 50% by weight of VF2, the copolymer being chosen from chlorotrifluoroethylene (CTFE), hexafluoropropylene (HFP), trifluoroethylene (VF3) and tetrafluoroethylene (TFE),
trifluoroethylene (VF3) homopolymers and copolymers,
copolymers, and in particular terpolymers, combining residues of chlorotrifluoroethylene (CTFE), tetrafluoroethylene (TFE), hexafluoropropylene (HFP) and/or ethylene units and optionally VF2 and/or VF3 units.

Preferred fluorinated polymer is a PVDF homopolymer or a PVDF copolymer containing at least 85% by weight of VF2 and more preferably 90%.

The aqueous dispersion of the fluorinated polymer can be made by any means but advantageously it is recovered during the synthesis of the fluorinated polymer. For example as regards PVDF, it is usually made by polymerization of VF2 and comonomer, if any, in suspension or emulsion in water. The aqueous dispersion of the fluorinated polymer is recovered as a step of its synthesis.

Aqueous dispersion of the fluorinated polymer may contain from 10 to 50% by weight of fluorinated polymer. Advantageously the dispersion comes from the polymerization process in emulsion.

As regards the aqueous solution of the anilinium salt it is made by mixing aniline, water and an acid. Operating conditions of this reaction are not critical and can vary widely. This reaction can be made at any pressure but it's easier to operate at atmospheric pressure. The temperature can be maintained in the range from 0° C. to 80° C. preferably in the range from 5° C. to 10° C. Should proportion of acid is over the stoechiometry the aqueous solution of anilinium salt is called acidified.

As regards aniline it could be without limitation, aniline or substituted aniline of formula (1)

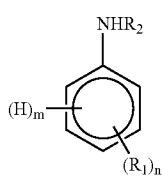

wherein:
n is an integer from 0 to 5;
m is an integer from 0 to 5, with the proviso that the sum of n and m is equal to 5 and with the further proviso that at least one position on the aniline ring, preferably at the para position, is substituted with a substituent which will allow coupling of the aniline units such halo, hydrogen or other leaving group;
$R_1$ is the same or different at each occurrence and is selected from the group consisting of alkyl, deuterium, alkenyl, alkoxy, cycloalkyl, cycloalkenyl, alkanoyl, alkylthio, aryloxy, alkylthioalkyl, alkylaryl, arylalkyl, amino, alkylamino, dialkylamino, arylamino, diarylamino, alkylarylamino, aryl, alkylsulfinyl, aryloxyalkyl, alkylsulfinylalkyl, alkoxyalkyl, phosphonic acid, alkylsulfonyl, arylthio, alkylsulfonylalkyl, boric acid, phosphoric acid, sulfinate salts, arylsulfinyl, alkoxycarbonyl, arylsulfonyl, carboxylic acid, phosphonic acid, halo, hydroxy, cyano, sulfinic acid, carboxylate salts, borate salts, phosphate salts, sulfonate salts, phosphinate salts, phosphonate salts, phosphonic acid, sulfonic acid, nitro, alkylsilane, or any of the foregoing aryl, aliphatic or cycloaliphatic groups substituted with one or more phosphonic acid, sulfonic acid, phosphoric acid, boric acid, carboxylate salt, borate salt, sulfonate salt, phosphinate salt, phosphonate salt, phosphate salt, phosphinic acid, carboxylic acid, halo, nitro, amino, alkylamino, dialkylamino, arylamino, diarylamino, alkylarylamino, cyano or epoxy moieties; or any two $R_1$ groups together or any $R_2$ group together with any $R_2$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more phosphonic acid, sulfonic acid, phosphoric acid, boric acid, carboxylate salt, borate salt, sulfonate salt, phosphinate salts, phosphonate salt, phosphate salt, phosphinic acid, carboxylic acid, halo, nitro, amino, alkylamino, dialkylamino, arylamino, diarylamino, alkylarylamino, cyano or epoxy moieties; or $R_1$ is an aliphatic moiety having repeat units of the formula:

—(OCH2CH2)$_q$O—CH3

—(OCH2CH(CH3))$_q$O—CH3

—(CH2)$_q$CF3

—(CF2)$_q$-CF3

—(CH2)$_q$-CH3 wherein q is a positive whole number; and $R_2$ is selected from the group consisting of permissible $R_1$ or substituents hydrogen.

The following listing of substituted and unsubstituted anilines are illustrative of those which can be used to prepare polymers and copolymers useful in the practice of this invention:
2-Cyclohexylaniline, 2-Acetylaniline, Aniline, 2,5-Dimethylaniline, o-Toluidine, 2,3-Dimethylaniline, 4-Propanoylaniline, 4-Benzylaniline, 2-(Methylamino)aniline, 4-Aminoaniline, 2-(Dimethylamino)aniline, 2-Methylthiomethylaniline, 2-Methyl-4-methoxy-carbonylaniline, 4-(2,4-Dimethylphenyl)aniline, N-Ethylaniline, 2-Ethylthioaniline, 4-Carboxyaniline, N-Methyl aniline, N-Methyl aniline, N-Propyl-m-toluidine, 2,4-Dimethylaniline, N-Methyl-o-cyanoaniline, N-Propyl aniline, 2,5-Dibutylaniline, N-Hexyl aniline, 2,5-Dimethoxyaniline, m-Toluidine, Tetrahydronaphthylamine, o-Ethylaniline, o-Cyanoaniline, m-Ethylaniline, 2-Methylthioaniline, o-Ethoxyaniline, 2,5-Dichloroaniline, m-Butylaniline, 3-(n-Butanesulfonic acid)aniline, m-Hexylaniline, m-Octylaniline, 3-Propoxymethylaniline, 4-Bromoaniline, 2,4-Dimethoxyaniline, 2-Bromoaniline, 4-Mercaptoaniline, 3-Bromoaniline, 4-Ethylthioaniline, 3-Acetamidoaniline, 3-Phenoxyaniline, 4-Acetamidoaniline, 4-Phenoxyaniline, 5-Chloro-2-methoxy-aniline, N-Octyl m-toluidine, 5-Chloro-2-ethoxy-aniline, 4-Trimethylsilylaniline, N-Hexyl-m-Toluidine, 3-Amino carbazole, 4-Phenylthioaniline, N-(p-Amino phenyl)aniline, 3-Amino-9-methylcarbazole, 4-Amino carbazole.

As regards the acid to make the anilinium salt it could be chosen, without limitation, among the following acids of formula (2) A-$R_3$ and (3)

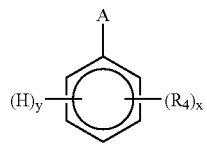

wherein: A is sulfonic acid, selenic acid, phosphonic acid or a carboxylic acid group; or hydrogen sulfate, hydrogen selenate, hydrogen phosphate;

x is an integer from 0 to 5;

y is an integer from 0 to 4 with the proviso that the sum of x and y is 5;

$R_3$ is alkyl, alkenyl, alkoxy, alkanoyl, alkylthio, alkylthioalkyl, having from 1 to about 20 carbon atoms; or alkylaryl, arylalkyl, alkylsulfinyl, alkoxyalkyl, alkylsulfonyl, alkoxycarbonyl, carboxylic acid, where the alkyl or alkoxy has from 0 to about 20 carbon atoms; or alkyl having from 3 to about 20 carbon atoms substituted with one or more sulfonic acid, carboxylic acid, halogen, nitro, cyano, diazo, or epoxy moieties; or a substituted or unsubstituted 3, 4, 5, 6 or 7 membered aromatic or alicyclic carbon ring, which ring may include one or more divalent heteroatoms of nitrogen, sulfur, sulfinyl, sulfonyl or oxygen such as thiophenyl, pyrolyl, furanyl, pyridinyl.

In addition to these monomeric acid forms, $R_3$ can be a polymeric backbone from which depend a plurality of acid functions "A." Examples of polymeric acids include sulfonated polystyrene, sulfonated polyethylene and the like. In these cases the polymer backbone should be selected to be soluble in the nonpolar organic solvent (plasticizer) such that highly polar polymers, for example polyacrylic acid or poly(vinylsulfonate) or the like, are usually not preferred.

$R_4$ is the same or different at each occurrence and is alkyl, alkenyl, alkoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, arylsulfonyl, carboxylic acid, halogen, cyano, or alkyl substituted with one or more sulfonic acid, carboxylic acid, halogen, nitro, cyano, diazo or epoxy moieties; or any two R substituents taken together are an alkylene or alkenylene group completing a 3, 4, 5, 6 or 7 membered aromatic or alicyclic carbon ring or multiples thereof, which ring or rings may include one or more divalent heteroatoms of nitrogen, sulfur, sulfinyl, sulfonyl or oxygen. $R_4$ typically has from about 1 to about 20 carbons especially 3 to 20 and more especially from about 8 to 20 carbons.

Preferred for use in the practice of this invention are acid of the above Formulas (2) and (3) in which:

A is sulfonic acid, phosphonic acid or carboxylic acid;

x is an integer from 1 to 5;

y is an integer from 0 to 4 with the proviso that the sum of x and y is 5;

$R_3$ is alkyl, alkenyl, alkoxy, alkanoyl, alkylthio, alkylthioalkyl, having from 5 to about 16 carbon atoms; or alkylaryl, arylalkyl, alkylsulfinyl, alkoxyalkyl, alkylsulfonyl, alkoxycarbonyl, carboxylic acid, where the alkyl or alkoxy has from 1 to about 20 carbon atoms; or alkyl having from 3 to about 20 carbon atoms substituted with one or more sulfonic acid, carboxylic acid, halogen, nitro, cyano diazo, or epoxy moieties;

$R_4$ is the same or different at each occurrence and is alkyl, alkenyl, alkoxy, arylalkyl, alkylsulfonyl, alkoxycarbonyl or carboxylic acid having from 1 to 12 carbon atoms, or alkyl substituted with one or more carboxylic acid, halogen, diazo or epoxy moieties.

Particularly preferred for use in the practice of this invention are acid of the above Formulas (2) and (3) in which:

A is sulfonic acid or carboxylic acid;

x is an integer from 1 to 3;

y is an integer from 0 to 4 with the proviso that the sum of x and y is 5;

$R_3$ is alkyl, alkenyl, alkoxy, having from 6 to about 14 carbon atoms; or arylalkyl, where the alkyl or alkyl portion or alkoxy has from 4 to about 14 carbon atoms; or alkyl having from 6 to about 14 carbon atoms substituted with one or more, carboxylic acid, halogen, diazo, or epoxy moieties;

$R_4$ is the same or different at each occurrence and is alkyl, alkoxy, alkylsulfonyl, having from 1 to 14 carbon atoms, or alkyl substituted with one or more halogen moieties again with from 4 to 14 carbons in the alkyl.

More preferred acids are p-toluene sulfonic acid, dodecylbenzene sulfonic acid, naphtalenedisulfonic acid and naphtalene sulfonic acid.

The aqueous solution of the anilinium salt may contain 5 to 40% by weight of anilinium salt and from 0 to 2 moles per liter of free acid (the acid mixed with the aniline to make the anilinium salt). The proportions of anilinium salt may be, by weight, 0.1 to 15% per 99.9 to 85%, respectively, of fluorinated polymer.

As regards the step b) and the oxidant it could be any oxidant provided it makes the doped PANI. Advantageously it is choosen among oxidants soluble in water. The oxidant may be a persulfate, a permanganate, a bichromate, a chromate or hydrogen peroxide. Preferred oxidant is ammonium persulfate or potassium persulfate or sodium persulfate. Proportion of said oxidant should be enough to make the polymerization of aniline and is determined by the man skilled in the art. The oxidant may be in the form of an aqueous solution. Such solution may contain, by weight, from 1 to 60% oxidant. It is recommended after step a) before step b) to wait a time enough for absorption of the anilinium salt on the surface of the particles of the fluorinated polymer. This time is around 20 minutes to 2 h. Operating conditions of this step b) are not critical and can vary widely. This reaction can be made at any pressure but it's easier to operate at atmospheric pressure. The temperature may be in the range 0 to 80° C.

As regards the step c) the alcohol is advantageously soluble in water and may be choosen among methanol and ethanol. The washing is made with enough water and/or alcohol and during a time enough to remove all by-products and unreacted aniline. It can be followed by checking the composition of the water and/or alcohol recovered at the outlet of the washing. Operating conditions of this step c) are not critical and can vary widely. This reaction can be made at any pressure but it's easier to operate at atmospheric pressure. The temperature may be in the range 0 to 80° C.

As regards the step d), this addition of the acid can be recommended if the washing of the previous step c) was too strong and had removed some part of the acid dopant, which protonated imine nitrogens of the polyaniline formed at the stage b), and resulted in lowered conductivity of the composite to less than $10^{-9}$–$10^{-1}$ S/cm. However, if this conductivity is enough to be used in practise, the stage d) is not necessary and can be canceled. In any case, with or without stage d) the conductivity of the fluorinated polymer composite is stable in produced ultimate articles due to the doped polyaniline protection by the fluorinated polymer matrix.

Any acid as cited above to prepare the anilinium salt can be used, advantageously in the present step d) the acid is the same as in the step a). This acid is advantageously added as (preferably 0.1–0.2 M) aqueous or organic (advantageously alcohol) solution which should cover the composite after stage c). Amount of acid to be added in this case is about 1.1–3 molar surplus to the initial quantity of aniline used at the step a). Use of the present step allows to increase conductivity of the final composite article for one to five orders of magnitude comparing to the article without this step.

Operating conditions of this step b) are not critical and can vary widely. This reaction can be made at any pressure but it's easier to operate at atmospheric pressure. The temperature may be in the range from 0 to 80° C. Time of the step may be in the range from 0.5 to 24 hours.

As regards the step e) this process is known in itself. Water can be removed by any means such as centrifugation, vacuum drying, atomization or any combination thereof. Then the remaining powder is melted and shaped in films, pellets or any object. It can be made in apparatus in use in the thermoplastics technology such as the mixers, extruders, molding and injection molding equipment.

This ultimate powder composite can be used for melt processing (melt compression, injection, extrusion, etc., at temperatures 175–240° C. to give articles with conductivity in the range $2 \times 10^{-12}$ to 2 S/cm. The articles may be printer rollers, pipes, ESD screens, films, heating sheets, . . . etc.

EXAMPLES

Example 1

At first two aqueous solutions are prepared:
of aniline and p-toluene sulfonic acid (TSA) to give after the base-acid reaction reaction the presence in the solution of 0.5 mol/L (~13.3 wt %) anilinium salt and 0.5 mol/L (~9 wt %) TSA;
of 0.625 mol/L (~15 wt %) ammonium persulfate Then 1.3 g of the anilinium salt acidified solution are added when agitation to 13 g of the stable PVDF latex (latex Kynar® 9000 manufactured by ATOFINA with 37.45 wt % of the solid PVDF phase). Kynar® 9000 is a PVDF homopolymer having a MVI (melt flow volume index) of 10 cm3/10 min under a load of 5 kg at 230° C. Then to the formed mixture 1.3 g of the ammonium persulfate solution is added stepwise through agitation. The reaction was run for 3 hours at 20° C. The result is a stable dark-green latex composition.

This final latex composition is washed by water at a filter under a reduced pressure with subsequent placing of the separated blue-green (slurry) solids in 0.2 M water solution of TSA for 30 min period at 20° C. followed by washing by a small quantity of water at a filter under a reduced pressure followed by drying. The ultimate dry powder green composite produced contains ~2 wt % of PANIxTSA and ~98% wt % of PVDF. These quantities are approximate because are based on the rough guess that all aniline is completely polymerized to give emeraldine salt with theoretically calculated molar ratio PANI:dopant=1:0.5.

The ultimate powder composite is used for melt compression at 180° C. to produce a dark green film with conductivity $8 \times 10^{-8}$ S/cm.

Example 2

This example is performed in similar way to Example 1 but with a twofold increase of quantity of both the anilinium salt mixed with the latex and the oxidant. Also in addition the oxidant solution is acidified by TSA with the concentration 1 mol/L (~18 wt %). The ultimate dry powder green composite produced of the final latex composition contains ~4 wt % of PANIxTSA and ~96% wt % of PVDF.

It is used for melt compression at 180° C., 200° C. and 220° C. to produce dark green films with conductivity $9.7 \times 10^{-4}$ S/cm, $2.2 \times 10^{-5}$ S/cm and $1.2 \times 10^{-6}$ S/cm correspondingly.

Example 3

This example is performed in a similar way to Example 1 but instead of TSA dodecylbenzene sulfonic acid (DBSA) is used. Also, at the stage d) of further use of the final latex composition the separated green (slurry) solids are placed in 0.2 M ethyl acetate and/or methanol instead of the water solution of DBSA for 30 min hours period at 50° C. followed by washing by a small quantity of water at a filter under a reduced pressure followed by drying. The ultimate dry powder green composite produced of the final latex composition contains ~3 wt % of PANIxDBSA and ~97 wt % of PVDF.

This ultimate powder composite is used for melt compression at 180° C. to produce a dark green film with conductivity $9 \times 10^{-3}$ S/cm.

Example 4

This example is performed in a similar way to Example 2 but Kynar® 1000 is used instead of Kynar® 9000. Kynar® 1000 is a PVDF homopolymer having a MVI (melt flow volume index) of 1.1 cm3/10 min under a load of 5 kg at 230° C. The Kynar® 1000 latex contains 37.45 wt % of PVDF.

The ultimate dry powder green composite produced of the final dispersion composition contains ~4 wt % of PANIx TSA and ~96 wt % of PVDF. It is used for melt compression at 180° C., 200° C. and 220° C. to produce dark green films with conductivity $8 \times 10^{-4}$ S/cm, $3.4 \times 10^{-5}$ S/cm and $1 \times 10^{-6}$ S/cm correspondingly.

Example 5

This example is performed in a similar way to Example 3 but with the next differences:
1. Kynar® 1000 latex was used, it contains 21.36 wt % of PVDF.
2. The higher quantities of aniline and DBSA were used to give ~4.8 wt. % of PANIxDBSA and ~95.2 wt % of PVDF in the final dispersion composition.
3. Potassium persulfate in the form of 10 wt. % water solution heated to 40° C. was used instead of the ammonium persulfate solution.
4. The reaction was run for 24 hours at ~10° C.
5. The step d) of additional doping was not used and directly after washing step c) the final latex composition was dried.

The ultimate powder composite was used for melt compression at 200° C. to produce a dark green film with conductivity 0.2 S/cm. Mixing of this powder composite with the pure Kynar® 1000 powder in ratio 1:1 allowed to produce by melt compression at 200° C. a dark green film with conductivity $3.6 \times 10^{-3}$ S/cm.

Aside from the above described comprehensive process, the present invention also comprises merely steps (a) and (b) inasmuch as the blend produced by step (b) constitutes a valuable intermediate product. Likewise the remaining powder in step (e) is a final product and does not require melting and shaping.

The entire disclosures of all applications, patents and publications, cited herein and of corresponding European application No. 02293103.4, filed Dec. 13, 2002 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process to make conductive a fluorinated polymer composition, said process comprising:
   a) mixing an aqueous solution of an anilinium salt with an aqueous dispersion of a fluorinated polymer,
   b) adding an oxidant polymerizing the anilinium salt to the mixture of step a) to make a blend of said fluorinated polymer and resultant doped polyaniline (PANI),
   c) removing by-products and unreacted aniline by washing with water or an alcohol to obtain a blend of purified fluorinated polymer and doped PANI,
   d) optionally mixing purified fluorinated polymer and doped PANI of step c) with an acid,
   e) removing water from purified fluorinated polymer and doped PANI of step c) or d) to obtain a powder.

2. A process according to claim 1 wherein the fluorinated polymer is a vinylidene fluoride (VF2) homopolymer or copolymer containing at least 50% by weight of VF2, the copolymer being chlorotrifluoroethylene (CTFE), hexafluoropropylene (HFP), trifluoroethylene (VF3) or tetrafluoroethylene (TFE).

3. A process according to claim 1 wherein the anilinium salt is produced by reacting an aniline with an acid of formula (2) A-$R_3$ or (3)

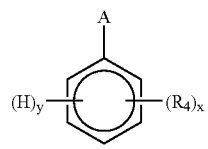

wherein: A is sulfonic acid, selenic acid, phosphonic acid, a carboxylic acid group, hydrogen sulfate, hydrogen selenate, or hydrogen phosphate;
x is an integer from 0 to 5;
y is an integer from 0 to 4 with the proviso that the sum of x and y is 5;
$R_3$ is alkyl, alkenyl, alkoxy, alkanoyl, alkylthio, or alkylthioalkyl, having from 1 to about 20 carbon atoms; or alkylaryl, arylalkyl, alkylsulfinyl, alkoxyalkyl, alkylsulfonyl, alkoxycarbonyl, or carboxylic acid, where alkyl or alkoxy has from 0 to about 20 carbon atoms; or alkyl having from 3 to about 20 carbon atoms substituted with one or more sulfonic acid, carboxylic acid, halogen, nitro, cyano, diazo, or epoxy moieties; or a substituted or unsubstituted 3, 4, 5, 6 or 7 membered aromatic or alicyclic carbon ring, which ring may include one or more divalent heteroatoms of nitrogen, sulfur, sulfinyl, sulfonyl or oxygen, or $R_3$ is a polymeric backbone from which depends a plurality of acid function A $R_4$ is the same or different at each occurrence and is alkyl, alkenyl, alkoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, arylsulfonyl, carboxylic acid, halogen, cyano, or alkyl substituted with one or more sulfonic acid, carboxylic acid, halogen, nitro, cyano, diazo or epoxy moieties; or any two R substituents taken together are an alkylene or alkenylene group completing a 3, 4, 5, 6 or 7 membered aromatic or alicyclic carbon ring or multiples thereof, which ring or rings may include one or more divalent heteroatoms of nitrogen, sulfur, sulfinyl, sulfonyl or oxygen.

4. A process according to claim 1 wherein the oxidant is ammonium persulfate, potassium persulfate or sodium persulfate.

5. A process according to claim 3, wherein the acid in step d) is the same as the one used to make the anilinium salt used in step a).

6. A process according to claim 1, further comprising melting and shaping the powder of step e).

7. A process according to claim 3, wherein the oxidant is ammonium persulfate, potassium persulfate or sodium persulfate.

8. In a process for producing a conductive fluorinated polymer composition, the improvement comprising:
   a) mixing an aqueous solution of an anilinium salt with an aqueous dispersion of a fluorinated polymer,
   b) adding an oxidant for polymerizing the anilinium salt to the mixture of step a) to make a blend of said fluorinated polymer and resultant doped polyaniline (PANI).

9. A process according to claim 1, wherein the oxidant is water-soluble.

10. A process according to claim 8, wherein the oxidant is water-soluble.

11. A process according to claim 10, wherein the oxidant is ammonium persulfate, potassium persulfate or sodium persulfate.

12. A process according to claim 1, wherein the amilinum salt is prepared from a aniline of formula (1)

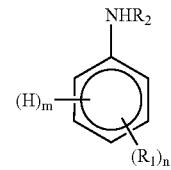

wherein:
n is an integer from 0 to 5;
m is an integer from 0 to 5, with the proviso that the sum of n and m is equal to 5 and with the further proviso that at least one position on the aniline ring is substituted with a substituent which will allow coupling of anilines;
$R_1$ is alkyl, deuterium, alkenyl, alkoxy, cycloalkyl, cycloalkenyl, alkanoyl, alkylthio, aryloxy, alkylthioalkyl, alkylaryl, arylalkyl, amino, alkylamino, dialkylamino, arylamino, diarylamino, alkylarylamino, aryl, alkylsulfinyl, aryloxyalkyl, alkylsulfinylalkyl, alkoxyalkyl, phosphonic acid, alkylsulfonyl, arylthio, alkylsulfonylalkyl, boric acid, phosphoric acid, sulfinate salts, arylsulfinyl, alkoxycarbonyl, arylsulfonyl, carboxylic acid, phosphonic acid, halo, hydroxy, cyano, sulfinic acid, a carboxylate salt, a borate salt, a phosphate salt, a sulfonate salt, a phosphinate salt, phosphonate salt, a phosphonic acid, sulfonic acid, nitro, or alkylsilane, each optionally substituted with one or more phosphonic acid, sulfonic acid, phosphoric acid, boric acid, carboxylate salt, borate salt, sulfonate salt, phosphinate salt, phosphonate salt, phosphate salt, phosphinic acid, carboxylic acid, halo, nitro, amino, alkylamino, dialkylamino, arylamino, diarylamino, alkylarylamino, cyano or epoxy moieties; or any two $R_1$ groups together or any $R_2$ group together with any $R_2$ group optionally forms a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more phosphonic acid, sulfonic acid, phosphoric acid, boric acid, carboxylate salt, borate salt, sulfonate salt, phosphinate salt, phosphonate salt, phosphate salt, phosphinic acid, carboxylic acid, halo, nitro, amino, alkylamino, dialkylamino, arylamino, diarylamino, alkylarylamino, cyano or epoxy moieties; or $R_1$ is an aliphatic moiety having repeating units of the formula:

-----(OCH2CH2)$_q$O—CH3      -----(OCH2CH(CH3))$_q$O—CH3

-continued

-----(CH2)$_q$CF3    -----(CF2)$_q$---CF3   or   -----(CH2)$_q$—CH3 wherein q is a positive whole number; and $R_2$ is a permissible $R_1$ substituent or hydrogen.

13. A process according to claim 12, wherein substituted aniline is 2-Cyclohexylaniline, 2-Acetylaniline, Aniline, 2,5-Dimethylaniline, o-Toluidine, 2,3-Dimethylaniline, 4-Propanoylaniline, 4-Benzylaniline, 2-(Methylamino)aniline, 4-Aminoaniline, 2-(Dimethylamino)aniline, 2-Methylthiomethylaniline, 2-Methyl-4-methoxy-carbonylaniline, 4-(2,4-Dimethylphenyl)aniline, N-Ethylaniline, 2-Ethylthioaniline, 4-Carboxyaniline, N-Methyl aniline, N-Methyl aniline, N-Propyl-m-toluidine, 2,4-Dimethylaniline, N-Methyl-o-cyanoaniline, N-Propyl aniline, 2,5-Dibutylaniline, N-Hexyl aniline, 2,5-Dimethoxyaniline, m-Toluidine, Tetrahydronaphthylamine, o-Ethylaniline, o-Cyanoaniline, m-Ethylaniline, 2-Methylthioaniline, o-Ethoxyaniline, 2,5-Dichloroaniline, m-Butylaniline, 3-(n-Butanesulfonic acid)aniline, m-Hexylaniline, m-Octylaniline, 3-Propoxymethylaniline, 4-Bromoaniline, 2,4-Dimethoxyaniline, 2-Bromoaniline, 4-Mercaptoaniline, 3-Bromoaniline, 4-Ethylthioaniline, 3-Acetamidoaniline, 3-Phenoxyaniline, 4-Acetamidoaniline, 4-Phenoxyaniline, 5-Chloro-2-methoxy-aniline, N-Octyl-m-toluidine, 5-Chloro-2-ethoxy-aniline, 4-Trimethylsilylaniline, N-Hexyl-m-Toluidine, 3-Amino carbazole, 4-Phenylthioaniline, N-(p-Amino phenyl)aniline, 3-Amino-9-methylcarbazole, or 4-Amino carbazole.

14. A process according to claim 1, wherein the acid of step a) is p-toluene sulfonic acid, dodecylbenzene sulfonic acid, naphtalene disulfonic acid or naphtalene sulfonic acid.

15. A process according to claim 3, wherein the acid of step a) is a polymeric backbone from which depends a plurality of acid functions A.

* * * * *

UNITED STATES PATENT AND TRADEMARK OFFICE
CERTIFICATE OF CORRECTION

| | | |
|---|---|---|
| PATENT NO. | : 7,211,202 B2 | Page 1 of 1 |
| APPLICATION NO. | : 10/734596 | |
| DATED | : May 1, 2007 | |
| INVENTOR(S) | : Alexander Korzhenko et al. | |

It is certified that error appears in the above-identified patent and that said Letters Patent is hereby corrected as shown below:

Column 12, line 7 reads "function" should read -- functions --

Signed and Sealed this

Thirty-first Day of July, 2007

JON W. DUDAS
*Director of the United States Patent and Trademark Office*